(No Model.)
A. J. ROBERTSON.
MEANS FOR COOLING JOURNALS AND BOXES.
No. 434,995. Patented Aug. 26, 1890.
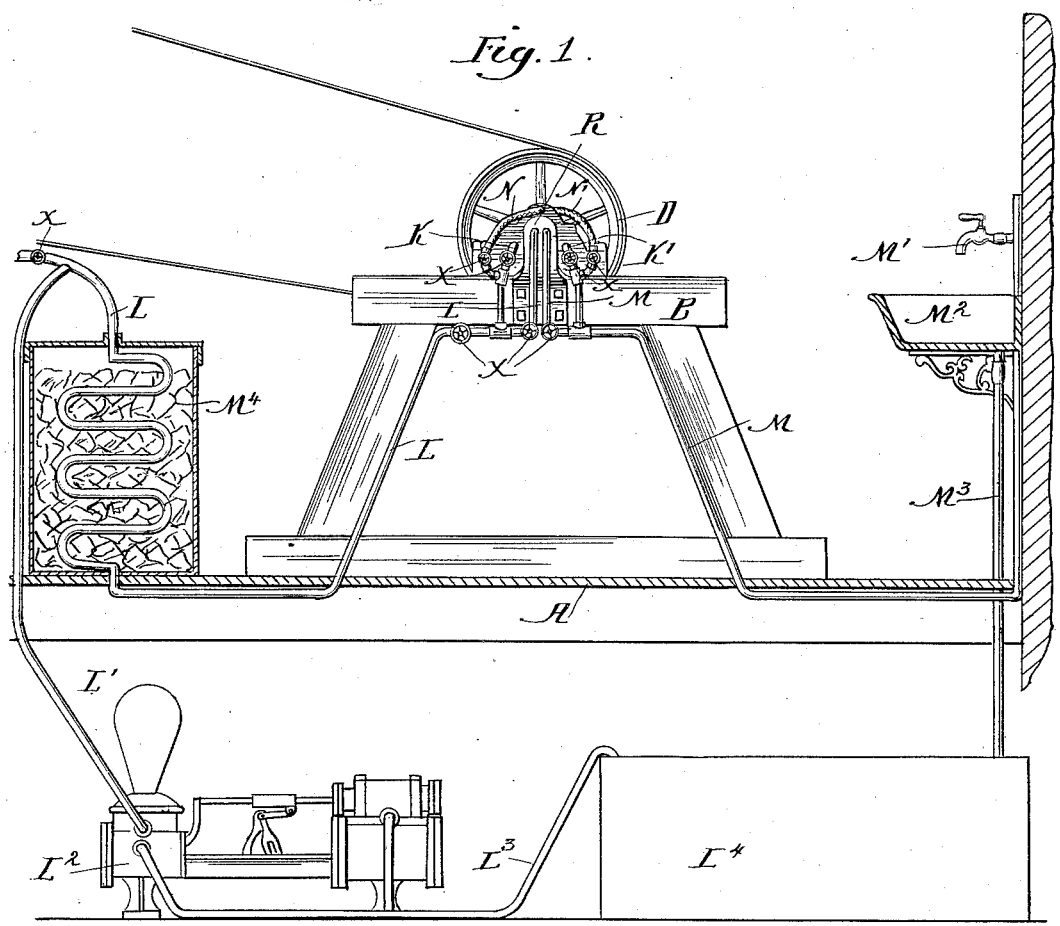
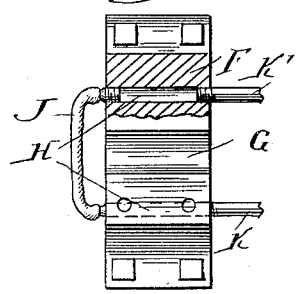
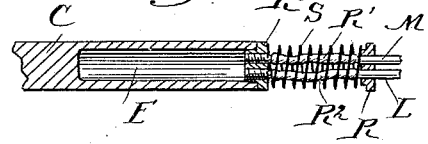
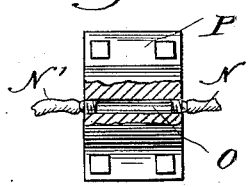
Witnesses:
Celeste P. Chapman.
Linda J. Johnson.
Inventor:
Archibald J. Robertson.
By Francis W. Parker
Attorney.

UNITED STATES PATENT OFFICE.

ARCHIBALD J. ROBERTSON, OF CHICAGO, ILLINOIS, ASSIGNOR OF ONE-HALF TO JOHN H. VOGT, OF SAME PLACE.

MEANS FOR COOLING JOURNALS AND BOXES.

SPECIFICATION forming part of Letters Patent No. 434,995, dated August 26, 1890.

Application filed January 6, 1890. Serial No. 336,025. (No model.)

*To all whom it may concern:*

Be it known that I, ARCHIBALD J. ROBERTSON, a subject to the Queen of Great Britain, and a resident of Chicago, in the county of Cook and State of Illinois, have invented a certain new and useful Improvement in Means for Cooling Journals and Boxes, of which the following is a specification.

My invention relates to means for cooling journals and boxes, and has for its object to provide means whereby the same can be accomplished in an easy and convenient manner.

My invention is illustrated in the accompanying drawings, wherein—

Figure 1 is a side and part-sectional view of one form of my device. Fig. 2 is a detail view of the lower box. Fig. 3 is a detail view of the upper box. Fig. 4 is a detail of the journal hollowed at one end; Fig. 5, journal hollowed at both ends or throughout.

Like parts are indicated by the same letters in all the figures.

A is the floor of the building, on which rests the frame B, having journaled upon it, for example, the axle C, carrying the pulley D. This axle is provided with the aperture E at one end or the aperture E' traversing its entire length.

The lower journal-box (lettered F) is provided with the bearing G to support the axle and the apertures H H, connected by the flexible coupling J at one end and connected at the other end with the pipes K and K', controlled by valves. Pipe K opens into the pipe L, which leads through the cooling-chamber $M^4$. One branch of this pipe may lead to a hydrant or other source of supply, while the branch L' leads to the pump $L^2$. From the pump leads the pipe $L^3$ to the reservoir $L^4$. The pipe K' opens into the pipe M, which leads, for example, to the faucet M', emptying into the sink $M^2$, from which leads the pipe $M^3$ to the reservoir. From the pipe K leads the valve-controlled flexible pipe N to one side of the upper portion of the journal-box. From the other side thereof leads the flexible valve-controlled pipe N' to the pipe K'. The pipes N and N' are connected by means of the aperture O in the upper box portion P. The pipes L and M are provided each with a valve and pass upwardly through the rigidly-fixed support R. Their inner ends are connected by the flexible connections R' and $R^2$ with the cap $R^3$, through which they independently open into the aperture E in the journal. S is a spiral spring encircling these flexible pipes and resting between the support R and the cap $R^3$, so as to keep the latter seated securely against the end of the journal. The structure is the same in the event of an axle hollow throughout its entire length, though here the pipe L will enter at one end and the pipe M will lead off from the other end. The channels or passages through the boxes or portions of the box may be variously shaped and situated, as will be clearly apparent, so as to distribute the cooling-fluid in such quantities and apply it at such places within such boxing as may be found desirable. In this particular class of cases I have shown simply continuous passages leading from one pipe to the other.

The valves are marked X and have no peculiar office to perform, except to generally control and regulate the application of the cooling fluids. It will, of course, be seen that other considerable changes could be made in the structure and arrangement without departing from the spirit of my invention. For example, I have shown the fluid as passing through a cooling-chamber. Of course, any kind of cooling-chamber could be used, and in many cases none is necessary. I have also shown a force-pump, which might not be necessary in the case of the use of hydrant-water. I have shown the sink and faucet, which would only be necessary in the event of it being important to use the fluid employed to cool the journals in the ordinary way.

The use and operation of my invention are as follows: It is well known that in case of rapidly-revolving journals great difficulty is encountered from the heating of the journal and box. I provide a current of cool fluid—as, for example, of water from a hydrant or other source, which water may be cooled through a cooling-chamber, as shown—and this, with or without high pressure, may be passed through the journal and box in the following manner: Entering at pipe L, it passes into the chamber E and out of such chamber through pipe M, and thence on to the discharge, providing the valves in the pipes L and M are open. A portion of this water will also pass through pipe K and flexible connection J and the apertures H H and the pipe K', and thence to the discharge, provided the valves in the pipes K and K' are open, and a portion of this water will pass through the flexible pipes N and N' and the passage O, and thence to the discharge, provided the valves in the pipes N and N' are open. If the axle is open from end to end, then a portion of the water would pass entirely through such axle to the discharge. As above suggested, other fluids than water could be used—as, for instance, compressed air—which could be permitted to expand in the chambers and pipes about the journal, or any of the well-known cooling-fluids could be employed for this purpose, the valves on the discharge side of the journal and box being regulated so as to control the flow of such particular fluid to produce the required effect in the vicinity of the heated parts.

Having thus described my invention, what I claim, and desire to secure by Letters Patent, is as follows:

1. The combination of a journal having a cylindrical cavity in the end thereof with a cap seated against such end, two elastic pipes connected with the perforations through such cap, a fixed standard to the perforations in which the other ends of these pipes are connected, a spiral spring encircling such pipes and bearing against the standard and cap, and thus securely holding the cap against the journal, and a system of fluid-supply pipes connected with such elastic pipes, so that a current of fluid may be discharged into such chamber and pass thence for the purpose of cooling the same.

2. The combination of a journal-box with two perforations therethrough in proximity with but not opening into the journal-bearing proper, an elastic or movable connection for such cavities on one side of such journal-box, and independent connecting-pipes opening one into each of such cavities on the opposite side of the box, and a system of cooling-fluid-supply pipes connected with such chamber, so as to pass a current of cooling-fluid therethrough.

ARCHIBALD J. ROBERTSON.

Witnesses:
FRANCIS W. PARKER,
CELESTE P. CHAPMAN.